United States Patent
Fuss

(10) Patent No.: US 6,449,436 B1
(45) Date of Patent: Sep. 10, 2002

(54) APERTURE ADJUSTMENT USING SHAPED MEMORY ALLOY

(75) Inventor: Timothy J. Fuss, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/826,114

(22) Filed: Apr. 4, 2001

(51) Int. Cl.[7] ............................. G03B 7/24; G03B 9/04
(52) U.S. Cl. ...................................... 396/208; 396/505
(58) Field of Search ............................ 396/207, 208, 396/257, 459, 505

(56) References Cited

U.S. PATENT DOCUMENTS

| | | |
|---|---|---|
| 1,934,484 A | 11/1933 | Camilli |
| 2,224,726 A | 12/1940 | Finnegan, Jr. et al. |
| 3,138,082 A | 6/1964 | Schrumpf |
| 4,576,460 A | 3/1986 | Daitoku et al. |
| 4,664,493 A | 5/1987 | Takagi |
| 4,860,040 A | 8/1989 | Tamamura et al. |
| 5,185,621 A | 2/1993 | Kagechika |
| 5,279,123 A | 1/1994 | Wechsler et al. |
| 5,459,544 A | 10/1995 | Emura |
| 6,242,841 B1 * | 6/2001 | Williams ............... 310/306 |

FOREIGN PATENT DOCUMENTS

| | | | |
|---|---|---|---|
| JP | 6-230457 | | 8/1994 |
| JP | 10-68979 | * | 3/1998 |
| JP | 2000-56355 A | * | 2/2000 |
| JP | 2000-221560 | * | 8/2000 |

* cited by examiner

Primary Examiner—Alan A. Mathews
(74) Attorney, Agent, or Firm—Roger A. Fields

(57) ABSTRACT

A camera adapted to receive any one of a plurality of film loads having different film speeds includes a film speed sensing device for sensing the particular film speed of a film load in the camera, an aperture setting device adjustable to effect different-diameter film exposing apertures, a shaped memory alloy (abbreviated to SMA) wire which when subjected to electrical current for different durations corresponding to the respective film speeds of the film loads is heated to undergo corresponding shape changes to adjust the aperture setting device to the respective film exposing apertures, and a current supplying circuit connected to the SMA wire and to the film speed sensing device that subjects the SMA wire to electrical current for any one of the durations in accordance with the particular film speed of a film load in the camera.

16 Claims, 8 Drawing Sheets

APERTURE ADJUSTMENT USING SHAPED MEMORY ALLOY

CROSS REFERENCE TO RELATED APPLICATION

Reference is made to commonly assigned copending application Ser. No. 09/758,810, entitled LENS DISPLACEMENT OR OTHER CONTROL USING SHAPED MEMORY ALLOY DRIVER and filed January 11, 2001 in the name of Timothy J. Fuss.

FIELD OF THE INVENTION

The invention relates generally to the field of photography, and in particular to cameras. More specifically, the invention relates to a camera in which aperture adjustment for an objective lens is accomplished using a shaped memory alloy driver.

BACKGROUND OF THE INVENTION

Prior art U.S. Pat. No. 5,279,123 issued Jan. 18, 1994 mentions that shaped memory alloy (abbreviated to SMA) devices are well known in the art to undergo a martensitic (diffusionless) transition dependent upon the temperature applied to the SMA device. The SMA device when heated above its transition temperature undergoes a shape change to a memorized shape and when cooled below its transition temperature reverses the shape change from the memorized shape to an original shape. This change in shape can be used to provide mechanical work.

Often, as disclosed in prior art U.S. Pat. No. 5,459,544 issued Oct. 17, 1995, the SMA device is a fine metallic wire. When electrical current is applied to lead wires connected to opposite ends of the SMA wire, the SMA wire is heated to due to electrical resistance and it shrinks or contacts, i.e. recovers, to a memorized shape. When the electrical current is discontinued, the SMA wire cools to extend, i.e. deform, to an original shape. One application of the SMA wire to do mechanical work in U.S. Pat. No. 5,459,544 is a lens displacing mechanism for an objective lens, including an actuator pivotable in opposite directions to displace the objective lens in respective directions and an SMA wire which when heated contracts to its memorized shape to pivot the actuator forward to displace the objective lens forward and when cooled extends to its original shape to allow a return spring to pivot the actuator rearward to displace the objective lens rearward. The objective lens is displaced between two extreme positions, a close or near focus position and a far or infinity focus position, to change the actual distance between the lens and the film plane in a camera in order to adjust the image sharpness. Another application of the SMA wire to do mechanical work in U.S. Pat. No. 5,459,544 is an aperture adjustment mechanism, including an aperture blade which has a large diameter hole and a small diameter hole and which can be translated in opposite directions to move either one of the holes into optical alignment with the objective lens, a cantilever leaf spring that is connected to the aperture blade between the two holes and that can snap in opposite directions to alternative stable positions to translate the aperture blade in opposite directions, and a pair of SMA wires that are connected to the leaf spring and when alternately heated to contract to their memorized states urge the leaf spring to snap to its respective stable positions.

The Cross-Referenced Application

The cross-referenced application discloses a camera control mechanism comprising an actuator movable to adjust an adjustable component, such as for lens focusing or aperture adjustment, and a shaped memory alloy (abbreviated to SMA) wire which when heated contracts to a memorized shape to move the actuator to adjust the adjustable component. The SMA wire has opposite ends that are fixed in place and an intermediate movable portion between the opposite ends that directly contacts the actuator to move the actuator when the SMA wire is heated to contract.

SUMMARY OF THE INVENTION

According to one aspect of the invention, a camera adapted to receive any one of a plurality of film loads having different film speeds comprises:

a film speed sensing device for sensing the particular film speed of a film load in the camera;

an aperture setting device adjustable to effect different-diameter film exposing apertures;

a shaped memory alloy (abbreviated to SMA) wire which when subjected to electrical current for different durations corresponding to the respective film speeds of the film loads is heated to undergo corresponding shape changes to adjust the aperture setting device to the respective film exposing apertures; and a current supplying circuit connected to the SMA wire and to the film speed sensing device that subjects the SMA wire to electrical current for any one of the durations in accordance with the particular film speed of a film load in the camera.

According to another aspect of the invention, a method of adjusting an aperture setting device to effect different-diameter film exposing apertures in a camera adapted to receive any one of a plurality of film loads having different film speeds comprises:

sensing the particular film speed of a film load in the camera; and subjecting a shaped memory alloy (abbreviated to SMA) wire to electrical current for different durations corresponding to the respective film speeds of the film loads, to heat the SMA wire to cause it to undergo corresponding shape changes and adjust the aperture setting device to the respective film exposing apertures in accordance with the particular film speed of a film load in the camera.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
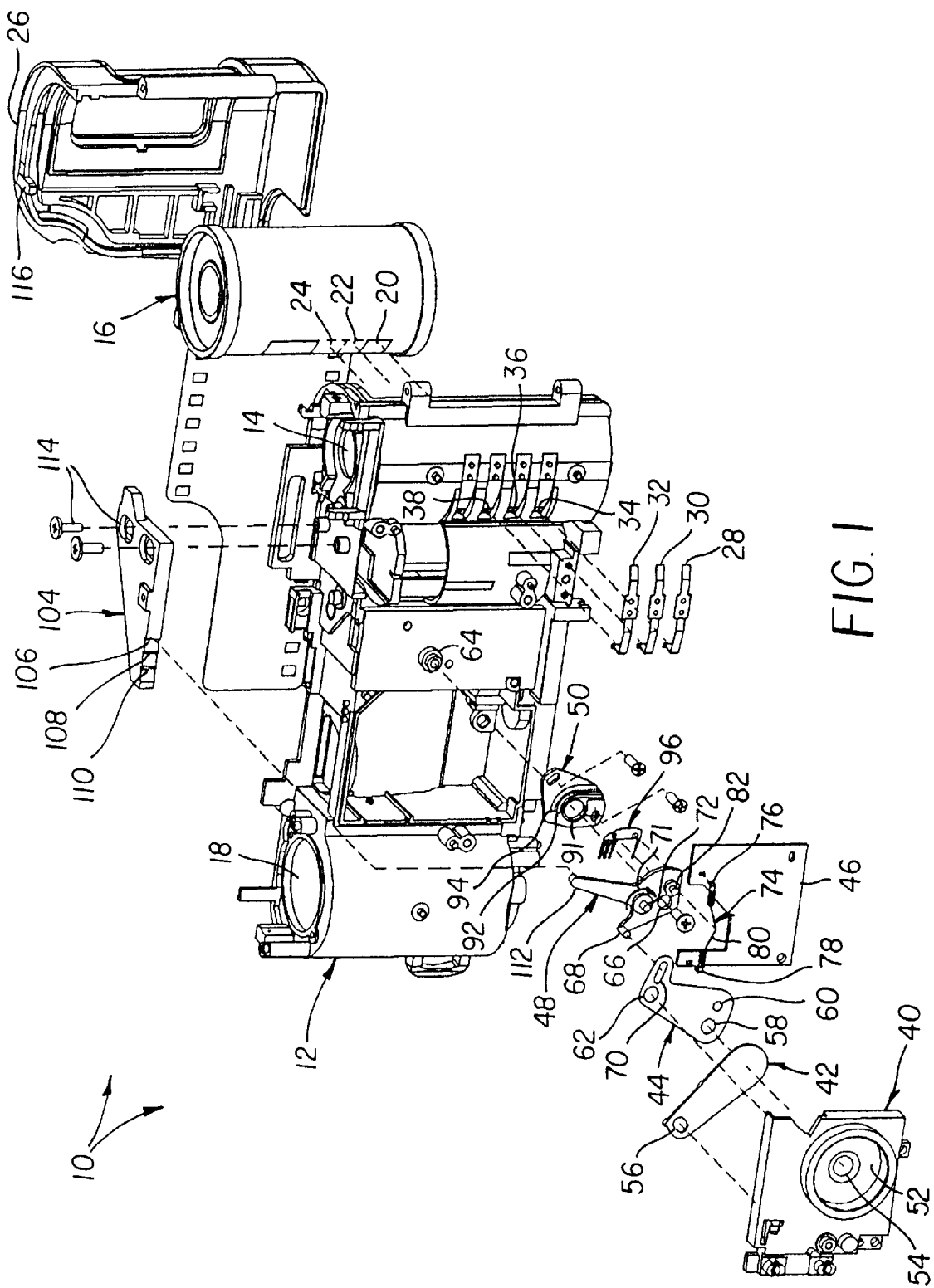
FIG. 1 is a front exploded perspective view of a partial camera that accomplishes aperture adjustment using a shaped memory alloy (abbreviated to SMA) driver.
Figure 2:
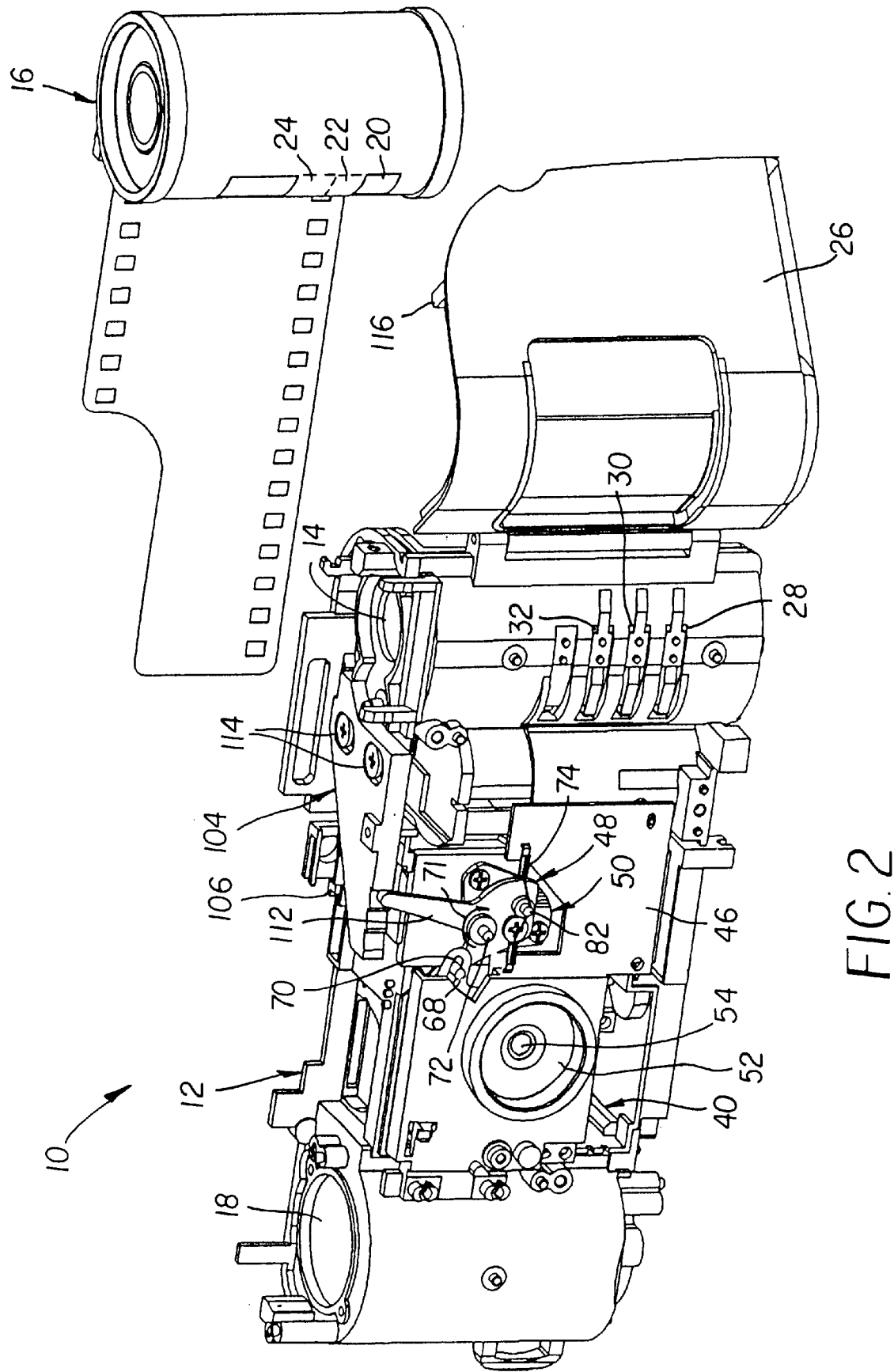
FIG. 2 is a front assembled perspective view of the partial camera.
Figure 5:
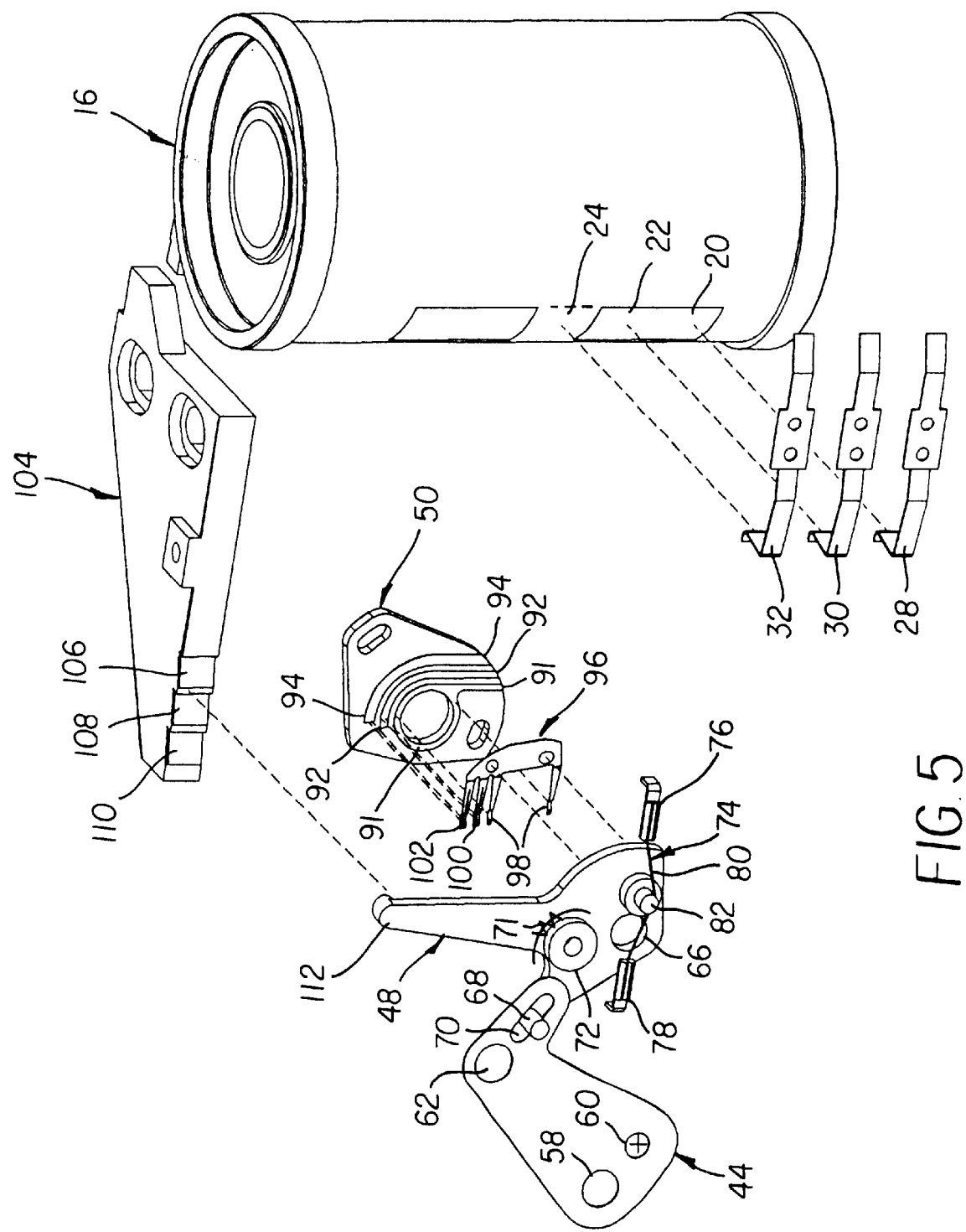
FIG. 5 is a is a front exploded perspective view of the aperture setting device, showing an f/11 aperture setting for a film speed ISO 400.
Figure 6:
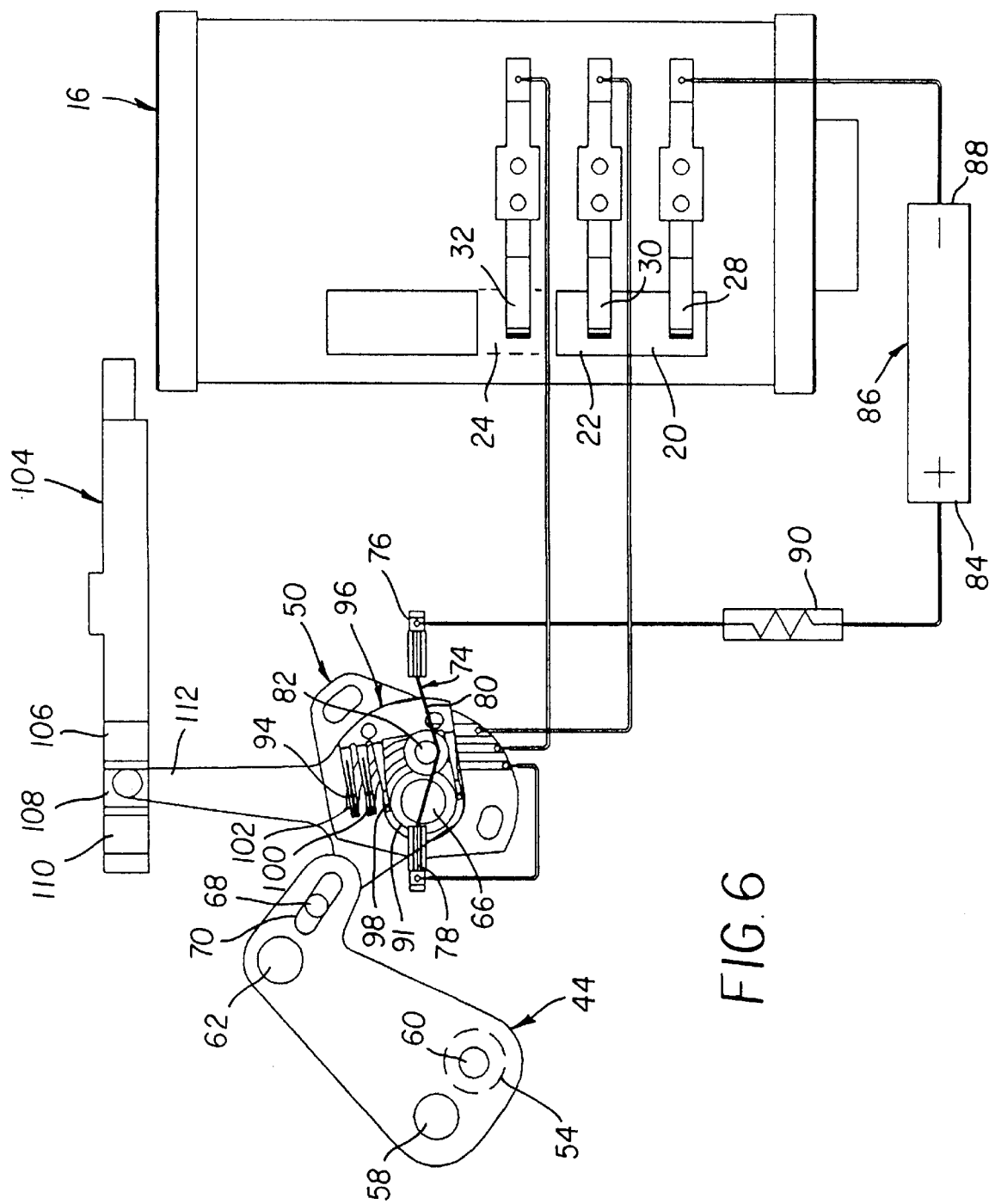
FIG. 6 is a is a front elevation view of the aperture setting device as in FIG. 5.
Figure 7:
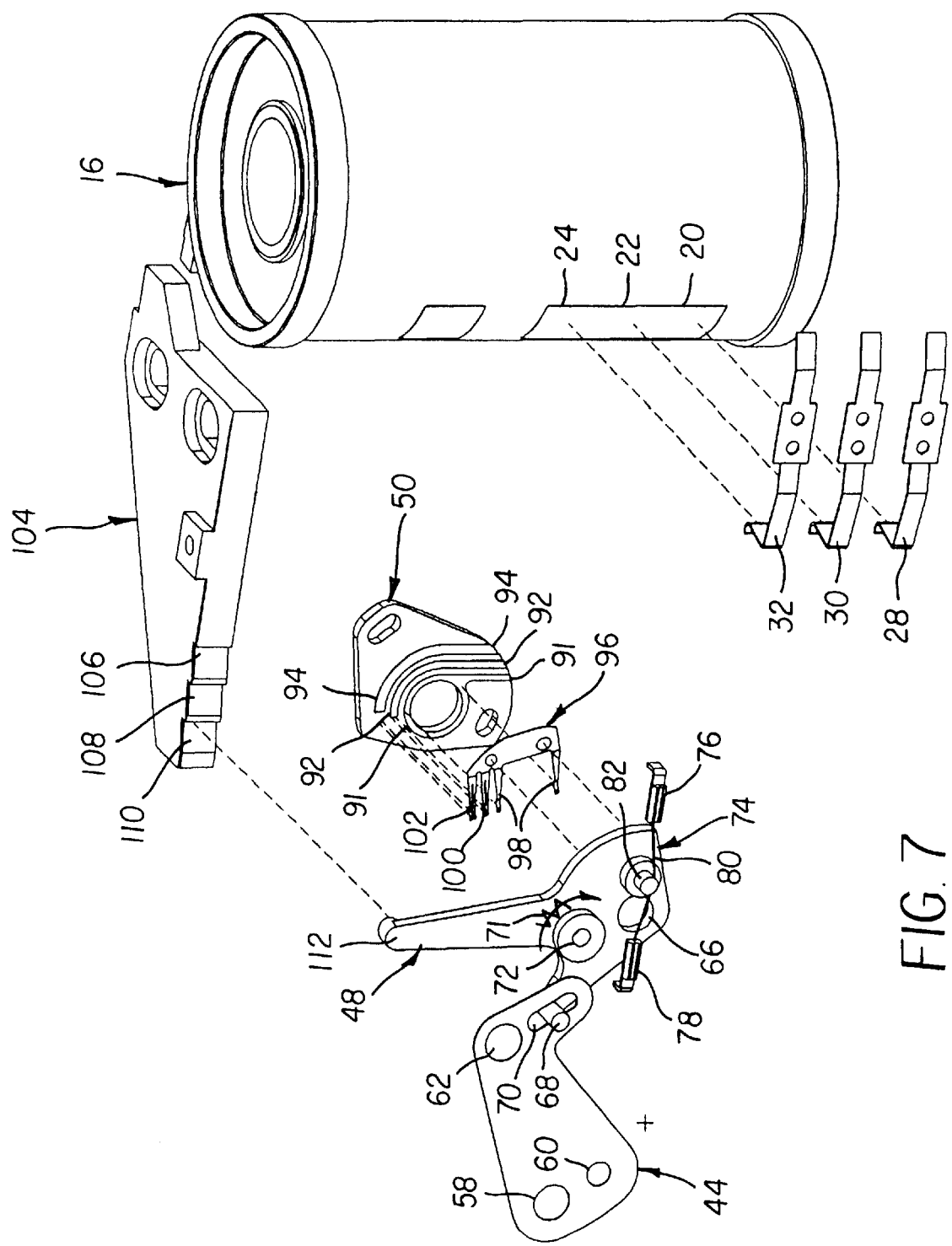
FIG. 7 is a is a front exploded perspective view of the aperture setting device, showing an f/5.6 aperture setting for a film speed ISO 800.
Figure 8:
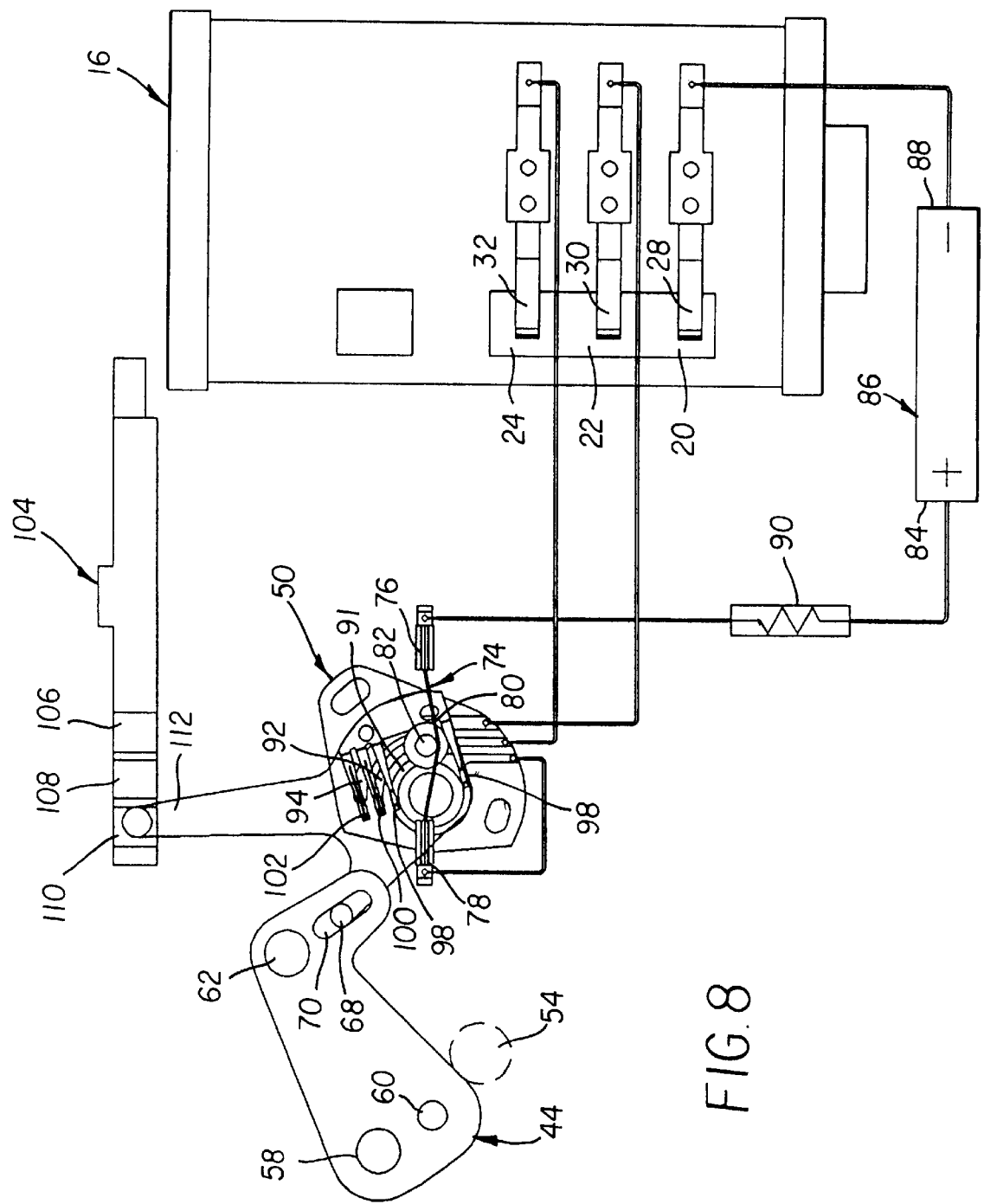
FIG. 8 is a is a front elevation view of an aperture setting device as in FIG. 7.

Referring now to the drawings, FIGS. 1 and 2 show a partial camera 10 including a main body part 12 that has a cartridge receiving chamber 14 for a standard 35 mm film cartridge 16. and has an exposed film roll chamber 18. As is known, the film cartridge 16 has the DX system of encoding film speed (ISO). The film speed is encoded by imprinting a pattern of conductive and non-conductive patches on an outer wall of the film cartridge 16. For example, the patches 20, 22 and 24, depending on whether they are conductive or non-conductive, indicate various film speeds. In FIGS. 1–4, the patch 20 is conductive and the patches 22 and 24 are non-conductive to indicate ISO 400. In FIGS. 5 and 6, the patches 20 and 22 are conductive and the patch 24 is non-conductive to indicate ISO 800. In FIGS. 7 and 8, the patches 20, 22 and 24 are conductive to indicate ISO 100 or 200. In each instance, the patch 20 is conductive as a common or ground patch. A rear door 26 is pivotally connected to the main body part 12 to be closed to light-tightly seal the cartridge receiving chamber 14 and to be opened to load/unload the film cartridge 16 into/from the chamber.

A film speed sensing device in the form of three separate film speed sensors 28, 30 and 32 are mounted on the main body part to project into the cartridge receiving chamber 14 at individual openings 34, 36 and 38 in the chamber. See FIG. 1. The film speed sensors 28, 30 and 32 make electrical contact with the patches 20, 22 and 24 on the film cartridge 16 in the cartridge receiving chamber 14 and sense whether the patches 30 and 32 are conductive or non-conductive.

A fixed mount plate 40 is mounted on the main body part 12 over a pivotable shutter blade 42 and a pivotable aperture blade 44. A fixed current-supplying circuit board 46, a pivotable actuator lever 48 and a fixed trace circuit board 50 are on the main body part 12. See FIGS. 1 and 2. The mount plate 40 has a recess 52 that contains an objective lens (not shown) and has an f/5.6 aperture 54. The shutter blade 42 is pivotally supported on the mount plate 40 at a pivot hole 56 in the shutter blade for closing and opening movements to normally cover and momentarily uncover the f/5.6 aperture 54. A torsion return spring (not shown) urges the shutter blade 42 closed to maintain the f/5.6 aperture 54 covered. The aperture blade 44 has an f/8 aperture 58 and an f/11 aperture 60, and is pivotally supported on the mount plate 40 at a pivot hole 62 in the aperture blade. By comparison, the f/5.6 aperture 54 is the largest diameter hole, the f/11 aperture 60 is the smallest diameter hole, and the f/8 aperture 58 is a mid-diameter hole. The actuator lever 48 is pivotally supported on the main body part 12 via a post 64 on the main body part that projects through a pivot hole 66 in the actuator lever. An actuator pin 68 on the actuator lever 48 projects through a slot 70 in the aperture blade 44 to pivot the aperture blade clockwise in FIG. 1 when the actuator lever is pivoted counter-clockwise and to pivot the aperture blade counter-clockwise in FIG. 1 when the actuator lever is pivoted clockwise. A torsion return spring 71 at a center post 72 on the actuator lever 48 urges the actuator lever clockwise in FIGS. 1–4 to, in turn, pivot the aperture blade 44 counter-clockwise to set the f/8 aperture 58 in the aperture blade in optical alignment with the f/5.6 aperture 54 in the mount plate 40. This effects a f/8 film-exposing aperture in FIGS. 1–4, which is a default aperture setting. If the actuator lever 48 is pivoted counter-clockwise (contrary to the urging of the torsion return spring 71) from its f/8 aperture setting as in FIGS. 5 and 6, the aperture blade 44 will be pivoted clockwise to set the f/11 aperture 60 in the aperture blade in optical alignment with the f/5.6 aperture 54 in the mount plate 40. This effects a f/11 film-exposing aperture in FIGS. 5 and 6, which is a non-default aperture setting. If the actuator lever 48 is pivoted counter-clockwise (contrary to the urging of the torsion return spring 71) from its f/8 aperture setting as in FIGS. 7 and 8, the aperture blade 44 will be pivoted clockwise to be completely removed from the f/5.6 aperture 54 in the mount plate 40. This effects a f/5.6 film-exposing aperture as in FIGS. 5 and 6, which is a non-default aperture setting. Thus, the aperture blade 44 and the actuator lever 48 act as an aperture setting device.

A shaped memory alloy (abbreviated to SMA) wire 74 has opposite ends 76 and 78 that are fixed on the current supplying circuit board 46 and an intermediate movable portion 80 between the opposite ends. The intermediate movable portion 80 of the SMA wire 74 extends partially around a catch pin 82 on the actuator lever 48 to longitudinally tension the SMA wire via the torsion return spring 71 for the actuator lever. See FIGS. 3–8. The wire end 76 is connected to the positive end 84 of a battery 86, and the negative end 88 of the battery is connected to the film speed sensor 28 for the conductive patch 20 on the film cartridge 16. A current limiting resistor 90 is located between the wire end 76 and the positive end 82 of the battery 86. The wire end 78 is connected to a common or ground trace (fixed electrical contact) 91 on the trace circuit board 50.

The trace circuit board 50, in addition to the common trace 91, has a f/5.6 trace (fixed electrical contact) 92 connected to the film speed sensor 32 for the conductive/non-conductive patch 24 on the film cartridge, and a f/11 trace (fixed electrical contact) 94 connected to the film speed sensor 30 for the conductive/non-conductive patch 22 on the film cartridge. See FIGS. 3–8.

The actuator lever 48 includes a switch device 96 that is affixed to the actuator lever for pivotal movement with the actuator lever and that has a pair of parallel common or ground switch elements 98 for making electrical contact with the common trace 91 on the trace circuit board 50 as in FIGS. 3–8, has a bifurcated f/5.6 switch element 100 for making electrical contact with the f/5.6 trace 92 on the trace circuit board as in FIGS. 3–8,. and has a bifurcated f/11 switch element 102 for making electrical contact with the f/11 trace 94 on the trace circuit board as in FIGS. 3–6.

Figure 4:
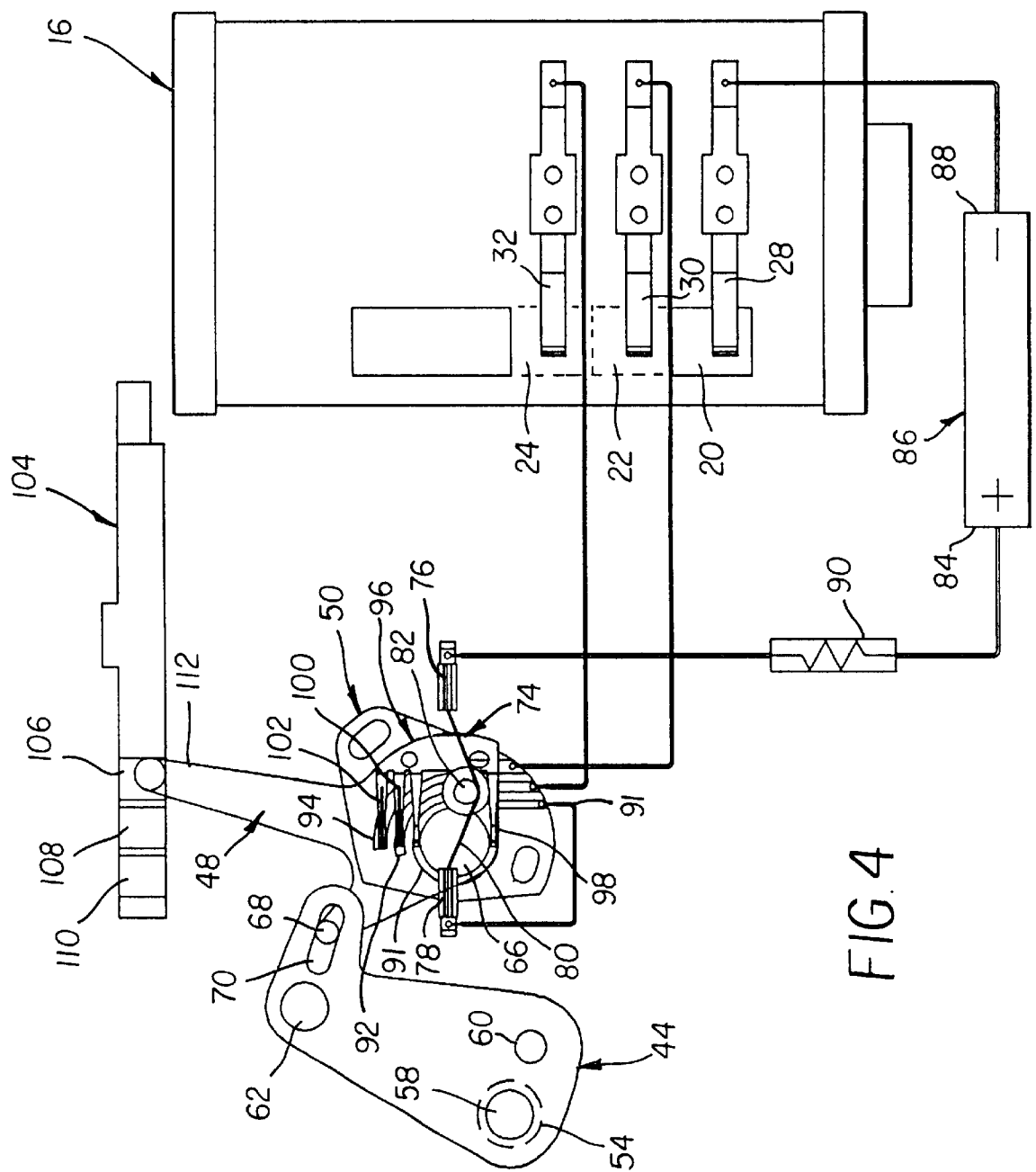
FIG. 4 is a is a front elevation view of the aperture setting device as in FIG. 3.

A retainer 104 has an f/8 notch 106, an f/11 notch 108 and an f/5.6 notch 110 that serve to alternatively engage with a finger 112 of the actuator lever 48 to hold the actuator in anyone of three positions as shown in FIGS. 4, 6 and 8. The retainer 104 is supported on the main body part 12 for translation forward and rearward via a pair of parallel pin-in-slot connections 114. See FIGS. 1 and 2. When the rear door 26 is closed, a push tab 116 on the rear door translates the retainer 104 forward to permit the retainer to engage with the finger 112 of the actuator lever 48. When the rear door 26 is opened, a helical compression return spring (not shown) translates the retainer 104 rearward out of engagement with the finger 112.

Operation

Figure 3:
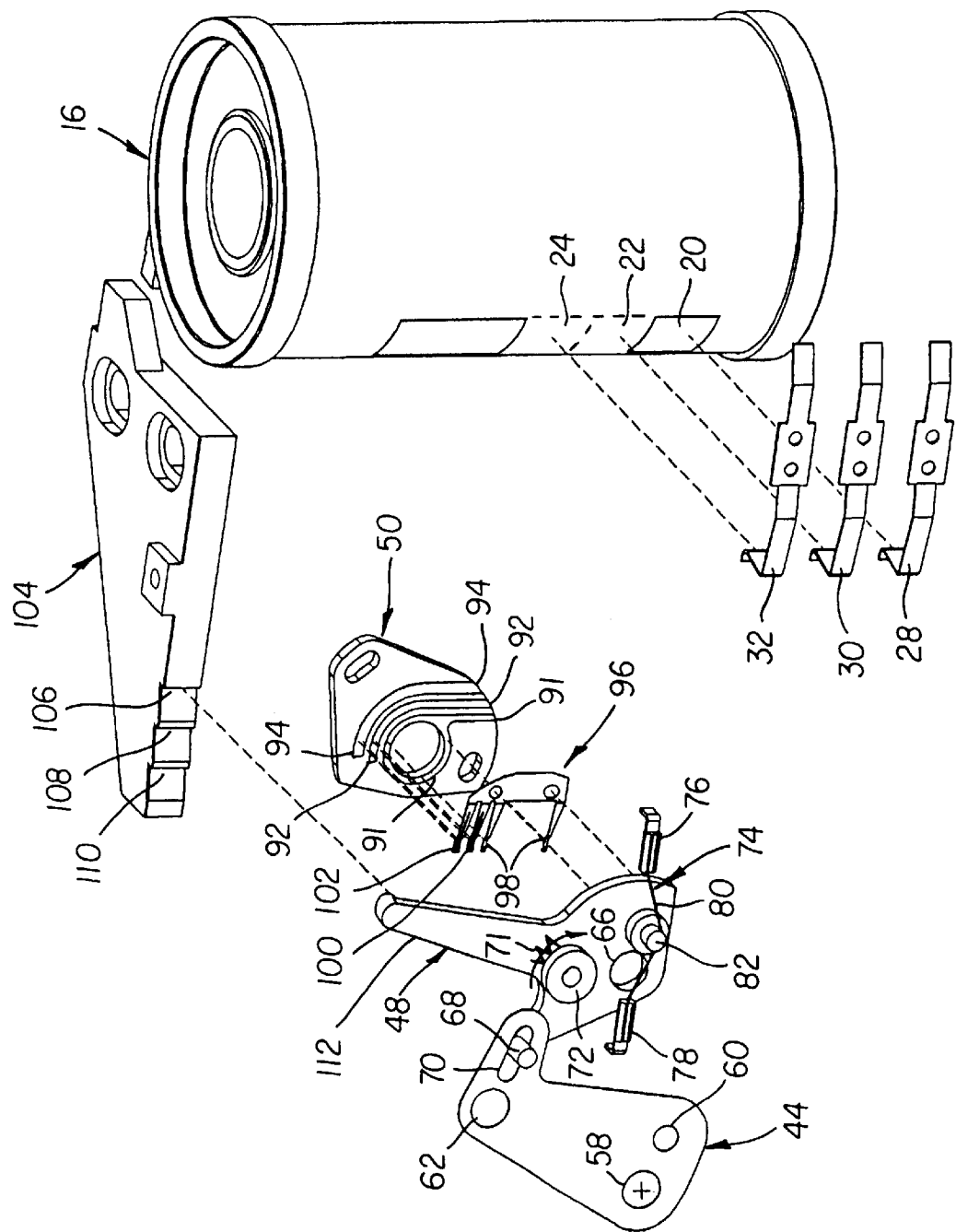
FIG. 3 is a front exploded perspective view of an aperture setting device in the camera, showing an f/8 aperture setting for a film speed ISO 100 or 200.

FIGS. 3 and 4:

FIGS. 3 and 4 show the situation when the film cartridge 16 in the cartridge receiving chamber 14 has its respective patches 20, 22 and 24 conductive, non-conductive and non-conductive, the finger 112 of the actuator lever 48 is engaged with the f/8 notch 106 in the retainer 104, the f/8 aperture 58 in the aperture blade 44 is in optical alignment with the f/5.6 aperture 54 in the mount plate 40 to effect a f/8 film-exposing aperture, the pair of common switch elements 98 of the switch device 96 make electrical contact with the common trace 91 on the trace circuit board 50, the bifurcated f/5.6 switch element 100 of the switch device makes electrical contact with the f/5.6 trace 92 on the trace circuit board, and the bifurcated f/11 switch element 102 of the switch device makes electrical contact with the f/11 trace 94 on the trace circuit board.

Since the patches 22 and 24 of the film cartridge 16 are each non-conductive, the application of electrical current to the SMA wire 74 is prevented. Thus, the f/8 film-exposing aperture remains.

FIGS. 5 and 6:

If conversely the film cartridge 16 in the cartridge receiving chamber 14 has its patches 20 and 22 each conductive (the patch 24 is non-conductive), electrical current is applied to the SMA wire 74. The SMA wire 74 then is heated above its transition temperature, which causes it to contract in contact with the catch pin 82 on the actuator lever 48. As a result, the actuator lever 48 is pivoted counter-clockwise in FIGS. 5 and 6 to pivot the aperture blade 44 clockwise to change the f/8 aperture 58 in the aperture blade from being in optical alignment with the f/5.6 aperture 54 in the mount plate 40 to the f/11 aperture 60 being in optical alignment with the f/5.6 aperture, to effect a f/11 film-exposing aperture, and to swing the finger 112 of the actuator lever 48 from being in the f/8 notch 106 in the retainer 104 to being in the f/11 notch 108 in the retainer, to retain the f/11 film-exposing aperture. As the finger 112 begins to enter the f/11 notch 108, the bifurcated f/11 switch element 102 of the switch device 96 (which is pivoted with the actuator lever 48) separates from the f/11 trace 94 on the trace circuit board 50 to discontinue the application of electrical current to the SMA wire 74. This allows the SMA wire 74 to begin to cool to extend. The pair of common switch elements 98 of the switch device 96 continue to make electrical contact with the common trace 91 on the trace circuit board 50, and the bifurcated f/5.6 switch element 100 of the switch device continues to make electrical contact with the f/5.6 trace 92 on the trace circuit board.

FIGS. 7 and 8:

If conversely the film cartridge 16 in the cartridge receiving chamber 14 has its patches 20 and 24 each conductive, electrical current is applied to the SMA wire 74. The SMA wire 74 then is heated above its transition temperature, which causes it to contract in contact with the catch pin 82 on the actuator lever 48. As a result, the actuator lever 48 is pivoted counter-clockwise in FIGS. 7 and 8 to pivot the aperture blade 44 clockwise to change the f/8 aperture 58 in the aperture blade from being in optical alignment with the f/5.6 aperture 54 in the mount plate 40 to the aperture blade being completely removed from the f/5.6 aperture in the mount plate, to effect a f/5.6 film-exposing aperture, and to swing the finger 112 of the actuator lever 48 from being in the f/8 notch 106 in the retainer 104 to being in the f/5.6 110 in the retainer, to retain the f/5.6 exposing aperture. As the finger 112 begins to enter the f/5.6 notch 110, the bifurcated f/5.6 switch element 100 of the switch device 96 (which is pivoted with the actuator lever 48) separates from the f/5.6 trace 92 on the trace circuit board 50 to discontinue the application of electrical current to the SMA wire 74. This allows the SMA wire 74 to begin to cool to extend. The pair of common switch elements 98 of the switch device 96 continue to make electrical contact with the common trace 91 on the trace circuit board 50.

The time it takes for the finger 112 of the actuator lever 48 to swing from being in the f/8 notch 106 in the retainer 104 to being in the f/5.6 notch 110 in the retainer as in FIGS. 7 and 8 is longer than the time it takes for the finger to swing from being in the f/8 notch to being in the f/11 notch as in FIGS. 5 and 6. Thus, the application of electrical current to the SMA wire 74 must be longer in the first instance. That is why the bifurcated f/5.6 switch element 100 of the switch device 96 (which is pivoted with the actuator lever 48) separates from the f/5.6 trace 92 on the trace circuit board 50 only in FIGS. 7 and 8.

When the rear door 26 is opened in FIGS. 5–8, the helical compression return spring (not shown) translates the retainer 104 rearward to disengage the f/11 notch 108 in the retainer from the finger 112 of the actuator lever 48 in FIGS. 5 and 6 or to disengage the f/5.6 notch 110 in the retainer from the finger in FIGS. 7 and 8. Then, the torsion return spring 71 pivots the actuator lever 48 clockwise in FIGS. 5–8 to return the aperture blade 44 counter-clockwise to re-set the f/8 aperture 58 in the aperture blade in optical alignment with the f/5.6 aperture 54 in the mount plate 40. This re-establishes the default aperture setting, i.e. the f/8 film-exposing aperture.

The invention has been described with reference to a preferred embodiment. However, it will be appreciated that variations and modifications can be effected by a person of ordinary skill in the art without departing from the scope of the invention.

PARTS LIST 10. camera
12. main body part
14. cartridge receiving chamber
16. film cartridge
18. exposed film roll chamber
20. patch
22. patch
24. patch
26. rear door
28. film speed sensor
30. film speed sensor
32. film speed sensor
34. opening
36. opening
38. opening
40. mount plate
42. shutter blade
44. aperture blade
46. circuit board
48. actuator lever
50. circuit board
52. recess
54. f/5.6 aperture
56. pivot hole
58. f/8 aperture
60. f/11 aperture
62. pivot hole
64. post
66. pivot hole
68. actuator Pin 70. slot
71. return spring
72. center post
74. SMA wire
76. wire end
78. wire end
80. intermediate wire portion
82. catch pin
84. positive end
86. battery
88. negative end
90. current limiting resistor
91. common trace
92. f/5.6 trace
94. f/11 trace
96. switch device
98. common switch elements
100. f/5.6 switch element
102. f/11 switch element
104. retainer
106. f/8 notch
108. f/11 notch
110. f/5.6 notch
112. finger
114. pin-in-slot connection
116. push tab

What is claimed is:

1. A camera adapted to receive any one of a plurality of film loads having different film speeds, comprising:
   a film speed sensing device for sensing the particular film speed of a film load in said camera;
   an aperture setting device adjustable to effect different-diameter film exposing apertures;
   a shaped memory alloy (abbreviated to SMA) wire which when subjected to electrical current for different durations corresponding to the respective film speeds of the film loads is heated to undergo corresponding shape changes to adjust said aperture setting device to said respective film exposing apertures; and
   a current supplying circuit connected to said SMA wire and to said film speed sensing device that subjects said SMA wire to electrical current for any one of the durations in accordance with the particular film speed of a film load in said camera.

2. A camera as recited in claim 1, wherein a retainer engages said aperture setting device adjusted to any one of said film exposing apertures when electrical current applied to said SMA wire is discontinued and disengages said aperture setting device when a film load is removed from said camera.

3. A camera as recited in claim 1, wherein a return spring urges said aperture setting device to adjust to a particular one of said film exposing apertures, and a retainer engages said aperture setting device to hold said aperture setting device adjusted to any one of said film exposing apertures and disengages said aperture setting device to permit said return spring to adjust said aperture setting device to said particular one of the film exposing apertures.

4. A camera as recited in claim 1, wherein said film speed sensing device has a plurality of film speed sensors, said circuit includes a plurality of electrical contacts connected to said respective film sensors, and said aperture setting device makes contact with at least two of said electrical contacts to subject said SMA wire to electrical current.

5. A camera as recited in claim 1, wherein said SMA wire has opposite ends fixed immovably to said current supplying circuit and an intermediate movable portion between said opposite ends which directly contacts said aperture setting device to adjust said aperture setting device to said film exposing apertures when said SMA wire undergoes said respective shape changes.

6. A camera comprising:
   a chamber for receiving any one of a plurality of film loads having different film speeds;
   a film speed sensing device for sensing the particular film speed of a film load in said chamber,
   an aperture blade movable to effect different-diameter film exposing apertures;
   an actuator movable to move said aperture blade to effect any one of said film exposing apertures;
   a shaped memory alloy (abbreviated to SMA) wire contacting said actuator and which when subjected to electrical current for different durations corresponding to the respective film speeds of the film loads is heated to undergo corresponding shape changes to move said actuator in order to move said aperture blade to effect any one of said film exposing apertures; and
   a current supplying circuit connected to said SMA wire and to said film speed sensing device that subjects said SMA wire to electrical current for any one of the durations in accordance with the particular film speed of a film load in said camera.

7. A camera as recited in claim 6, wherein a retainer is engageable with said actuator to prevent movement of said actuator when said actuator has been moved to move said aperture blade to effect any one of said film exposing apertures and is movable to disengage said actuator to release said actuator when a film load is removed from said chamber.

8. A camera as recited in claim 6, wherein said film speed sensing device has a plurality of film speed sensors, said circuit includes a plurality of fixed electrical contacts connected to said respective film sensors; and said actuator has a plurality of switch elements for making contact with different ones of said electrical contacts to subject said SMA wire to electrical current for the respective durations.

9. A camera adapted to receive any one of a plurality of film loads having different film speeds, comprising:
   a film speed sensing device for sensing the particular film speed of a film load in said camera;
   an aperture setting device which is adjustable to a plurality of aperture settings to effect different-diameter film exposing apertures and which has an actuator movable to a plurality of positions to adjust said aperture setting device to its respective settings;
   a spring that urges said actuator to a particular one of its positions;
   a shaped memory alloy (abbreviated to SMA) wire contacting said actuator and which when subjected to electrical current for different durations corresponding to the respective film speeds of the film loads is heated to undergo corresponding shape changes to move said actuator to its respective positions except the one position that said spring urges said actuator to; and
   a current supplying circuit connected to said SMA wire and to said film speed sensing device that subjects said SMA wire to electrical current for any one of the durations in accordance with the particular film speed of a film load in said camera.

10. A camera as recited in claim 9, wherein a retainer is engageable with said actuator to prevent movement of said actuator from its respective positions and is movable to disengage said actuator to release said actuator from its respective positions.

11. A method of adjusting an aperture setting device to effect different-diameter film exposing apertures in a camera adapted to receive any one of a plurality of film loads having different film speeds, comprising:

sensing the particular film speed of a film load in the camera; and subjecting a shaped memory alloy (abbreviated to SMA) wire to electrical current for different durations corresponding to the respective film speeds of the film loads, to heat the SMA wire to cause it to undergo corresponding shape changes and adjust the aperture setting device to the respective film exposing apertures in accordance with the particular film speed of a film load in the camera.

12. A method as recited in claim 11, further comprising: engaging the aperture setting device adjusted to any one of the film exposing apertures with a retainer to retain the aperture setting device when electrical current for the SMA wire is discontinued.

13. A method as recited in claim 12, further comprising: disengaging the aperture setting device when a film load is removed from the camera.

14. A camera adapted to receive any one of a plurality of film loads having different film speeds, comprising:

an aperture setting device adjustable to effect different-diameter film exposing apertures;

means for sensing the particular film speed of a film load in said camera;

a shaped memory alloy (abbreviated to SMA) wire which when subjected to electrical current for different durations corresponding to the respective film speeds of the film loads is heated to undergo corresponding shape changes to adjust said aperture setting device to said respective film exposing apertures; and means for subjecting said SMA wire to electrical current for any one of the durations in accordance with the particular film speed of a film load in said camera.

15. A camera as recited in claim 14, further comprising:

means for engaging said aperture setting device only when adjusted to any one of said film exposing apertures to retain said aperture setting device when electrical current for said SMA wire is discontinued.

16. A camera as recited in claim 15, wherein said means for engaging disengages said aperture setting device adjusted to any one of said film exposing apertures when a film load is removed from said camera.

* * * * *